Dec. 15, 1925.  
O. MOORE  
SLIDING TROLLEY  
Filed June 22, 1922  
1,565,487
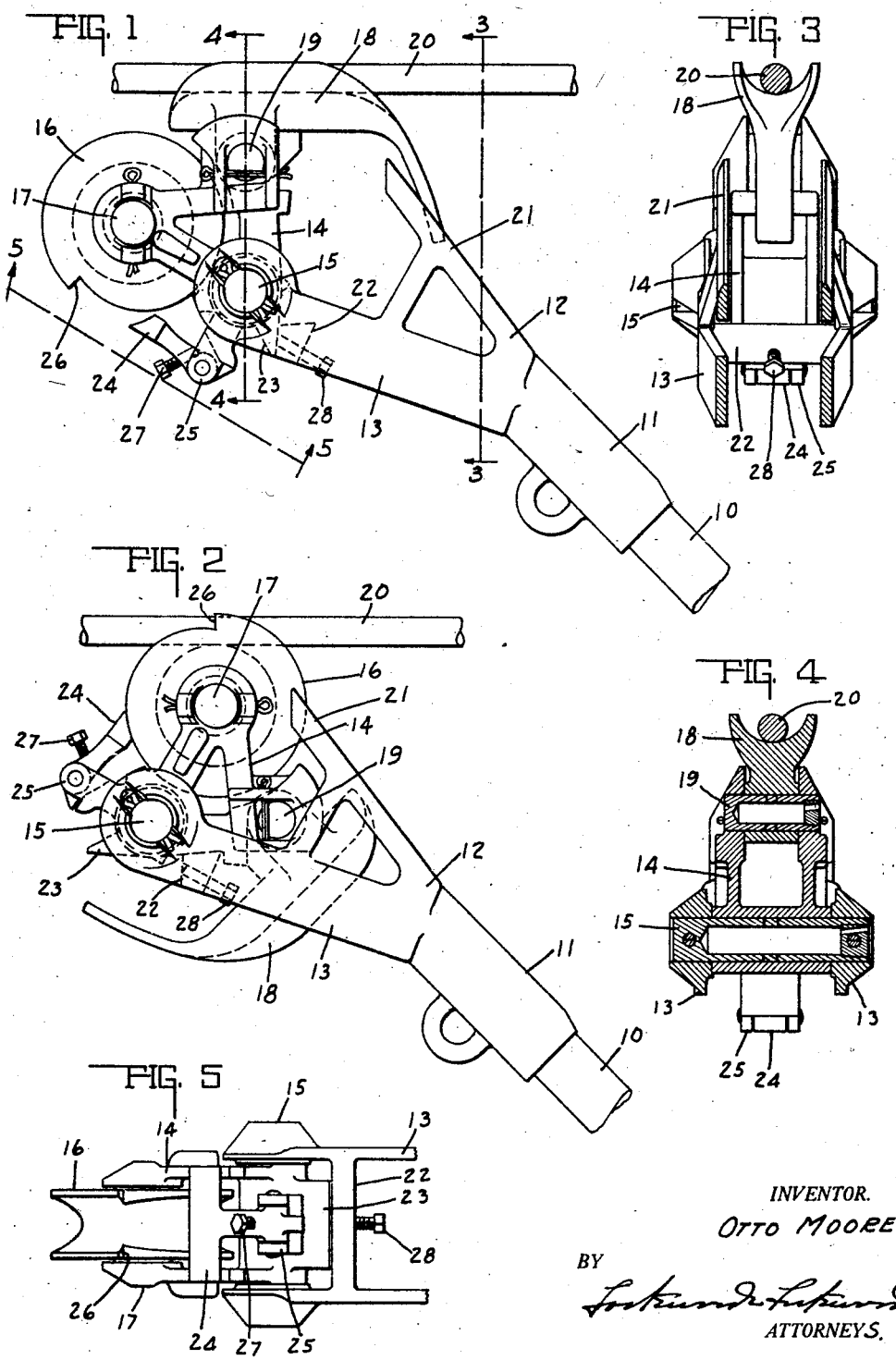
INVENTOR.  
OTTO MOORE  
BY  
ATTORNEYS.

Patented Dec. 15, 1925.

1,565,487

UNITED STATES PATENT OFFICE.

OTTO MOORE, OF FRANKFORT, INDIANA, ASSIGNOR TO TROLLEY SHOE-WHEEL COMPANY, OF INDIANAPOLIS, INDIANA, A CORPORATION OF INDIANA.

SLIDING TROLLEY.

Application filed June 22, 1922. Serial No. 570,135.

*To all whom it may concern:*

Be it known that I, OTTO MOORE, a citizen of the United States, and a resident of Frankfort, county of Clinton, and State of Indiana, have invented a certain new and useful Sliding Trolley; and I do hereby declare that the following is a full, clear, and exact description thereof, reference being had to the accompanying drawings, in which like numerals refer to like parts.

This invention relates to a sliding trolley of the type shown in my Reissue Patent, No. 15,252, reissued December 20, 1921.

The main feature of this invention resides in the construction of the trolley, whereby the wearing parts thereof are readily removable and replaceable individually, without the necessity of replacing other and unworn parts.

Another feature of the invention resides in the mounting of the sliding shoe, whereby it may readily adjust itself to a high or low wire, or the sagging of the wire.

Another feature of the invention resides in the guard for protecting the trolley from being damaged upon jumping the trolley wire and coming in contact with the cross supporting wires. The guard is so arranged as to carry the cross wire up to the shoe so as to readily slide thereover.

Still another feature of the invention resides in the means for adjusting the parts of the shoe so as to allow the trolley wheel to be placed in permanent use in event the shoe wears out or becomes broken during the trip where repair parts are unavailable.

The full nature of the invention will be understood from the accompanying drawings and the following description and claims.

In the drawings, Fig. 1 is a side elevation of the trolley in normal position with the sliding shoe engaging the trolley wire. Fig. 2 is the same as Fig. 1 showing the trolley moved to a reverse position with the trolley wheel in engagement with the wire. Fig. 3 is a view of the trolley taken from the line 3—3 of Fig. 1. Fig. 4 is a section taken on the line 4—4 of Fig. 1. Fig. 5 is a view taken from the line 5—5 of Fig. 1.

In the drawings there is shown a trolley pole 10 having a socket 11 mounted upon the end thereof carrying the trolley harp 12. The trolley harp consists of the bifurcated arms 13 between the ends of which is pivoted a supporting frame 14 on the pin 15. The frame 14 is cast integral and substantially triangular in side elevation as shown in Fig. 1. The pin 15 extends through one corner of the triangle, which as represented in said figure is the lower corner. In the left hand or lateral corner of the triangle, there is pivotally mounted the trolley wheel 16 which is supported by the pin 17. Said pin is adapted to rotate in suitable bearings in the frame 14, and is secured in position therein by the usual cotter pins extending through each end. The trolley wheel 16 is also adapted to rotate on the pin 17. Said pin is removable from the frame 14 and wheel 16, whereby said wheel may be readily removed from the frame for replacement.

Pivotally mounted in the upper corner of the frame 14, there is a sliding shoe 18 extending longitudinally of the harp and pivotally supported upon the pin 19 mounted in suitable bearings in said frame. The pin 19 is held in place by the usual cotter pins, so that it may be readily removed from the frame and shoe for permitting the removal and replacement of said shoe. The pivotal mounting of the shoe permits it to readily adjust itself to the trolley wire 20 regardless of the height of the wire and the consequent angle thereto taken by the trolley pole. Both the shoe 18 and the trolley wheel 16 are grooved in the usual manner, as shown in Figs. 3 and 5, so as to permit them to ride the wire.

The harp 12 is provided with a cast-on guard 21 positioned on each side thereof and extending upwardly at an angle for engaging and carrying a cross supporting wire on to the shoe so as to permit it to readily slide thereover. Said guard is provided for the protection of the trolley in event it jumps the wire and strikes the cross wire as sometime occurs.

The harp is provided with a cross bar 22 secured between the arms 13 against which the lower projection 23 of the frame 14 is adapted to engage for limiting the pivotal or swinging movement of the frame toward the rear. The friction and pressure exerted upon the shoe by the trolley wire when the trolley is moving forward will tend to hold the projection 23 of said frame against the cross bar, as shown in Fig. 1. The trolley wire will also maintain the shoe in the position shown in Fig. 1, in proper engagement therewith, although said shoe is free to rotate about the pin 19.

Upon the car reversing and moving the trolley backwards, the friction of the wire will push the frame downwardly into the position shown in Fig. 2, said frame turning about the pin 15. In this position the forward side of the frame will rest upon the cross bar 22 and maintain the trolley wheel in engaging position with the wire. When in this position the shoe will swing down between the arms 13 out of engagement with the wire and in inoperative position.

Upon the trolley again being moved forwardly, the rotation of the trolley wheel in that direction will be stopped by the pawl 24. Said pawl is pivotally mounted upon the projecting ear 25 extending rearwardly from the frame 14, and is adapted to engage in the recess 26 formed in the flanges of the trolley wheel. It will be obvious that the wheel will be free to move in one direction, but upon its being reversed will be stopped by said pawl. Upon the trolley wheel being stopped from rotation, the friction caused by its sliding engagement with the wire will tend to swing the frame upwardly into the position shown in Fig. 1, whereby the shoe will engage therewith and the wheel will move downwardly and out of engagement.

If it should be desirable to use the wheel entirely, in case of damage to the shoe, the pawl 24 may be withheld from engagement with said wheel by screwing the bolt 27 therethrough into engagement with the frame 14. This will permit the free rotation of the wheel in either direction. For maintaining the wheel in engaging position, the screw 28 may be screwed through the cross bar 22 into engagement with the frame 14 for permanently holding it in position in Fig. 2.

The invention claimed is:

1. A sliding trolley for an electric driven vehicle comprising a trolley harp, a contact member pivotally mounted upon said harp in position to engage and make contact with a trolley wire only when the trolley is moving in one direction, and a second contact member pivotally mounted upon said harp for making contact with the trolley wire when moving in the opposite direction, said members being removably mounted thereon independently of each other.

2. A sliding trolley for an electric driven vehicle comprising a trolley harp, a supporting frame pivotally mounted upon said harp, a contact member pivotally mounted upon said frame in position to engage and make contact with a trolley wire only when the trolley is moved in one direction, and a second contact member pivotally mounted upon said frame adapted to engage the trolley wire when the trolley is moving in the opposite direction.

3. A sliding trolley for an electric driven vehicle comprising a trolley harp, a frame pivotally mounted upon said harp, a sliding contact member pivotally and removably mounted upon said frame adapted to engage a trolley wire only when the trolley is moving in one direction, and a rotating contact member pivotally and removably mounted upon said frame adapted to engage said trolley wire when the trolley is moving in the opposite direction.

4. A sliding trolley for an electric driven vehicle comprising a trolley harp, a frame pivotally mounted upon said harp, a sliding contact shoe pivotally mounted on said frame so as to be removable therefrom, and a rotating trolley wheel rotatably mounted on said frame independently of said shoe and removable therefrom.

5. A sliding trolley for an electric driven vehicle comprising a trolley harp, a sliding shoe carried by said harp in position to engage and make contact with a trolley wire only when the trolley is moving in one direction, a trolley wheel carried by said harp and adapted to engage the trolley wire when the trolley is moving in the opposite direction, a pawl mounted in connection with said trolley wheel for stopping its rotation in one direction, and means on said pawl for withholding it from engagement with said wheel when so desired for permitting its free rotation in either direction.

6. A sliding trolley for an electric driven vehicle comprising a trolley harp, a sliding shoe carried by said harp in position to engage and make contact with a trolley wire only when the trolley is moving in one direction, a trolley wheel carried by said harp and adapted to engage the trolley wire when the trolley is moving in the opposite direction, a pawl mounted in connection with said trolley wheel for stopping its rotation in one direction, and a set screw for withholding said pawl from engagement with said wheel when so desired for permitting its free rotation in either direction.

7. A sliding trolley for an electric driven vehicle comprising a trolley harp, a frame pivotally mounted on said harp, a sliding shoe carried by said frame in position to engage and make contact with a trolley wire only when the trolley is moving in one direction, a trolley wheel carried by said harp and adapted to engage the trolley wire when the trolley is moving in the opposite direction, and a set screw for adjustably limiting the movement of said frame upon said harp, substantially as and for the purpose set forth.

8. A sliding trolley for an electric driven vehicle comprising a harp mounted upon the trolley pole for making an electrical connection with a trolley wire having supporting cross wires, a sliding shoe adapted to contact with said wire when the trolley moves in one direction, a rotating trolley wheel adapted to contact with said wire when the trolley moves in the opposite direction, and a guard member carried by said harp and slanting upwardly substantially in alignment with the trolley pole adapted to cause a supporting cross wire to carry over said shoe and trolley wheel.

9. A sliding trolley including a trolley pole, a trolley harp mounted on said pole for making electrical contact with a trolley wire, a hub member pivotally mounted on said harp, a sliding shoe detachably secured to said hub member, a trolley wheel detachably secured to said member, and means for limiting the pivotal movement of said hub member and trolley wheel for causing said shoe to slidably engage the wire when moving in one direction, and said wheel to engage the wire when moving in the opposite direction.

10. A sliding trolley including a trolley pole, a trolley harp mounted on said pole for making electrical contact with a trolley wire, a supporting member pivotally mounted on said harp having a plurality of bracket arms, a sliding shoe detachably secured to one of said arms, a trolley wheel pivotally mounted on one of said arms, and means for limiting the movement of said shoe and trolley wheel, whereby said shoe will be caused to engage said wire when moving in one direction, and said wheel will rotatably engage said wire when moving in the opposite direction.

11. A sliding trolley including a trolley pole, a trolley harp mounted on said pole for making electrical contact with a trolley wire, a supporting member pivotally mounted on said harp having a plurality of bracket arms, a sliding shoe detachably secured to one of said arms, a trolley wheel rotatably mounted on one of said arms, a pawl pivotally mounted on said supporting member for engaging a notch in said trolley wheel for preventing its rotation in one direction, and means connected with said shoe for limiting its pivotal movement, whereby said shoe will be caused to slidably engage said trolley wire when the pole moves in one direction, and said wheel will rotatably engage said trolley wire when said poles moves in the opposite direction.

In witness whereof, I have hereunto affixed my signature.

OTTO MOORE.